May 6, 1952

C. E. INGALLS 2,595,263

APPARATUS FOR MEASURING THE PHASE SHIFT
BETWEEN THE INPUT AND OUTPUT VOLTAGES
OF A CIRCUIT UNDER TEST

Filed April 12, 1946

INVENTOR
CLYDE E. INGALLS

BY *M. O. Hayes*

ATTORNEY

INVENTOR
CLYDE E. INGALLS

BY *M. A. Hayes*

ATTORNEY

Patented May 6, 1952

2,595,263

UNITED STATES PATENT OFFICE 2,595,263

APPARATUS FOR MEASURING THE PHASE SHIFT BETWEEN THE INPUT AND OUTPUT VOLTAGES OF A CIRCUIT UNDER TEST

Clyde E. Ingalls, Canisteo, N. Y., assignor, by mesne assignments, to the United States of America as represented by the Secretary of the Navy Application April 12, 1946, Serial No. 661,600

2 Claims. (Cl. 172—245)

This invention relates to electrical indicating and measuring devices and particularly to apparatus for electrically indicating and measuring the phase difference of two voltage waves or currents having the same frequency.

The knowledge of the phase difference between signals is required in practice for many purposes; for instance, measurement of distances with the aid of reflected waves as in radars, altimeters, and direction finders. In vacuum tube amplifiers the phase difference between the input and output signals becomes increasingly important as the band pass of the amplifier is increased.

It is an object of this invention to provide novel apparatus with which phase shift of a voltage or current wave of fixed or variable frequency may be rapidly measured.

It is another object of this invention to provide a method and apparatus for simply and accurately measuring and indicating the phase difference of two voltages or current waves of the same frequency, one being the input and the other the output, of a circuit under test.

These and other objects and advantages will suggest themselves to one skilled in the art and will become apparent from the following description of the invention taken in connection with the accompanying drawing in which.

Figure 1:
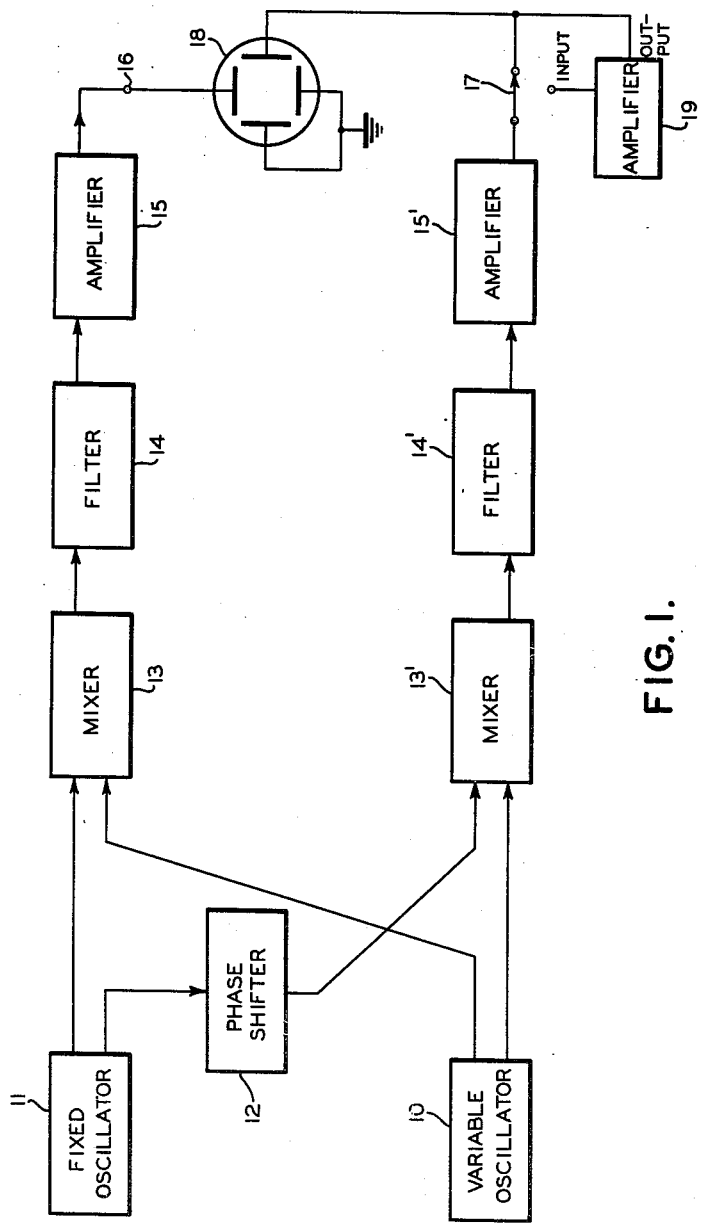
Fig. 1 is a block diagram of an embodiment of the invention.

Referring to the drawings, and particularly to Fig. 1, output signals of variable frequency oscillator 10 are connected to the substantially identical mixers 13 and 13'. Fixed frequency oscillator 11 is connected to mixer 13 and to calibrated phase shifting device 12, preferably a poly-phase condenser and phase-splitting network, and thence to mixer 13'. Substantially identical low pass filters 14 and 14' are fed by the outputs of mixers 13 and 13' respectively, which outputs are of equal frequency and equal to the difference (or sum) between the frequencies of oscillators 10 and 11. The outputs of filters 14 and 14' are amplified by amplifiers 15 and 15' respectively and fed to a conventional type phase detector 18, preferably a cathode ray oscilloscope as diagrammatically illustrated by the deflection plates thereof, through terminal 16 and switch 17.

In operation, consider oscillator 10 adjusted so that its voltage output is $E_1 \cos(\omega_1 t + \phi_1)$ where $E_1$, $\omega_1$, and $\phi_1$ are respectively the amplitude, angular velocity, and relative phase of the voltage, and the voltage output of oscillator 11 is $E_2 \cos(\omega_2 t + \phi_2)$ when $E_2$, $\omega_2$ and $\phi_2$ are respectively the amplitude, angular velocity, and relative phase of the voltage. Phase shifter 12, if adjusted to introduce a phase shift, applies the voltage $E_2 \cos(\omega_2 t + \phi_2')$ to mixer 13'. The voltage, $e_g$, applied to the grid of mixer 13 is therefore:

$$e_g = E_1 \cos(\omega_1 t + \phi_1) + E_2 \cos(\omega_2 t + \phi_2)$$

and the voltage, $e_g$, applied to the grid of mixer 13' is:

$$e_g' = E_1 \cos(\omega_1 t + \phi_1) + E_2 \cos(\omega_2 t + \phi_2')$$

The plate currents of mixers 13 and 13' are found by substituting the above equation in the following equations:

$$i_p = i_o + K_1 e_g + K_2 e_g^2 + K_3 e_g^3 + \ldots$$

where $i_p$ is the plate current, $i_o$ is the direct current component of the plate current, $e_g$ is the grid voltage, and $e_g^2$ is the grid voltage squared, etc.

Low pass filters 14 and 14' are designed so that they reject direct current, $i_o$, in the above equation, and so that the highest frequency passed is lower than the frequency corresponding to the angular velocities $\omega_1$ and $\omega_2$. The output of filter 14 is then proportional to $$K_2 E_1 E_2 \cos[(\omega_2 - \omega_1)t + (\phi_2 - \phi_1)]$$

which is amplified without further change in amplifier 15 and connected to the vertical deflection plates of phase detector 18. Likewise the output of filter 14' is proportional to $$K_2 E_1 E_2 \cos[(\omega_2 - \omega_1)t + (\phi_2' - \phi_1)]$$

which is amplified without further change in amplifier 15' and connected to the horizontal deflection plates of phase detector 18.

The two voltages applied to the phase detector then have the same frequency but differ in phase by the angle $(\phi_2' - \phi_2)$ which is the phase introduced by phase shifter 12 in the voltage from oscillator 11 to mixer 13'.

As a preliminary adjustment, phase shifter 12 is adjusted until phase detector 18 indicates no difference in phase between the two voltages fed to it and the calibration dial (not shown) on phase shifter 12 is then set to read zero. The circuit 19 to be tested for amount of phase shift (in this instance an amplifier) is then inserted by changing the position of switch 17 so that the signal output of amplifier 15' passes through amplifier 19, and again adjusting phase shifter 12 until phase detector 18 shows no difference in phase in the two voltages applied to it. The amount of phase shift introduced by inserted circuit 19 is then read directly from the aforementioned calibrated dial on phase shifter 12.

Phase detector 18 is independent of frequency, and thus a circuit may be checked for phase shift over a wide range of frequencies simply by turning variable oscillator 10 to change the frequency of the signal fed to the circuits illustrated.

Figure 2:
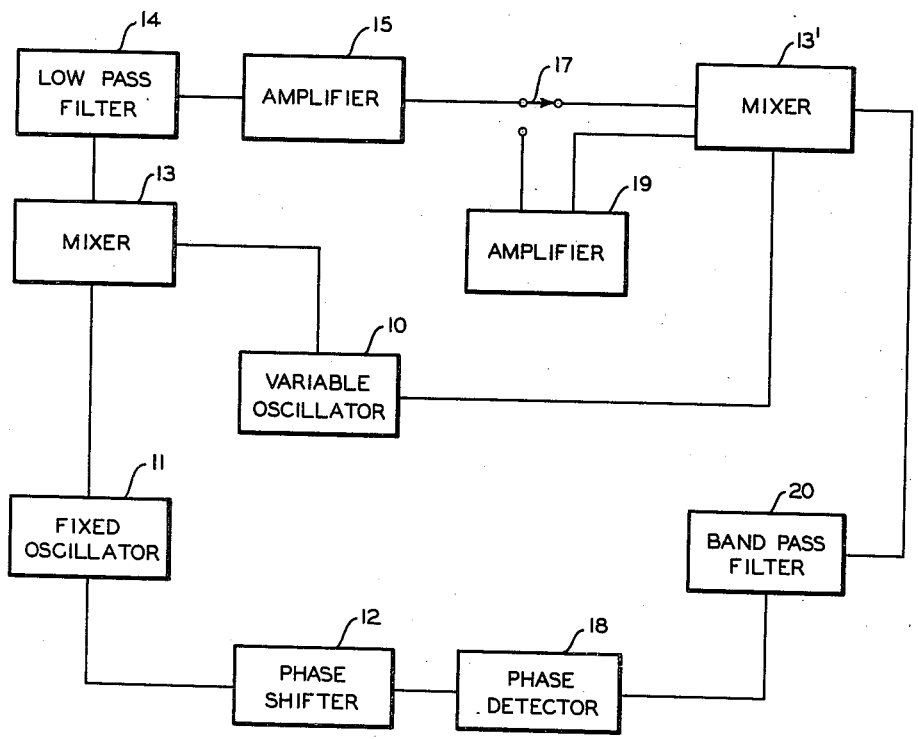
Fig. 2 is a block diagram of another embodiment of the invention.

Reference is made to Fig. 2 which is another embodiment of the invention wherein phase detector 18 need not be independent of frequency. Elements in Fig. 2, which function as in Fig. 1 have been similarly numbered.

Variable oscillator 10 and fixed oscillator 11 are connected to mixer 13, whose output feeds low pass filter 14 and amplifier 15 as described in Fig. 1. The output of amplifier 15 and variable oscillator 10 are connected to mixer 13' whose output feeds bandpass filter 20. Filter 20 is chosen so that its band pass frequency is the same as the frequency of the oscillations of fixed oscillator 11. Calibrated phase shifting device 12, preferably a poly-phase condenser and phase-splitting network, is connected to fixed oscillator 11. Phase detector 18 is fed by phase shifter 12 and by mixer 13' through filter 20.

In operation, a signal whose frequency is equal to the difference of the frequencies of variable oscillator 10 and fixed oscillator 11 is applied to the circuit under test, amplifier 19, through switch 17. The output of amplifier 19 is mixed with the same variable oscillator signal in mixer 13' to produce a voltage whose frequency is the same as fixed oscillator 11. Filter 20 excludes all of the other heterodyned signals from phase detector 18. Calibrated phase shifter 12 is then adjusted so that phase detector 18 indicates no phase difference between the two signals connected to it. The amount of phase shift introduced by amplifier 19 is then read from the calibrated dial, not shown, of phase shifter 12.

Phase shift for comparison purposes and phase detection for indicating purposes is thus accomplished at a constant frequency irrespective of the frequency of the test signal applied to the circuit under test, amplifier 19 in this case.

The circuits of this invention may be used as an automatic range computer of the phase shift type in radar systems by substituting a rectifier type of phase detector for detector 18, whose output feeds a conventional servo mechanism for continuously positioning phase shifter 12 and the range dials of the radar.

Although the drawing and specification show what is now considered to be the most desirable arrangement, it will be apparent to one skilled in the art that various applications, changes, and modifications may be made therein without departing from the scope of the invention as set forth in the appended claims.

What is claimed is:

1. Apparatus for measuring the phase shift between the input and output voltages of a circuit comprising, a fixed frequency oscillator, a variable frequency oscillator, first and second mixer circuits, means for applying the output of said variable frequency oscillator directly to said first and second mixers, an adjustable phase shifter, means for applying a portion of the output of said fixed frequency oscillator through said phase shifter to said second mixer, means for applying another portion of the output of said fixed frequency oscillator directly to said first mixer, first and second filters respectively coupled to said first and second mixers for selectively passing signals of the same frequency, a phase detector, means for applying the signals from said first and second filters to said phase detector whereby an initial indication of the difference in phase of said signals may be obtained, and means for disconnecting said second filter from said phase detector and connecting said circuit under test between said second filter and said phase detector, whereby the adjustment of said phase shifter to obtain an indication corresponding to said initial indication is a measure of the phase shift introduced by said circuit.

2. Apparatus for measuring the phase shift between the input and output voltages of a circuit under test comprising, a fixed frequency oscillator, a variable frequency oscillator, an adjustable phase shifter, first means for combining a portion of the output from each of said fixed and variable frequency oscillators to obtain signals having frequencies equal to the sum and difference of the frequencies of said variable frequency oscillator and said fixed frequency oscillator, second means for combining a portion of the output of said variable frequency oscillator and a portion of the output of said fixed frequency oscillator shifted in phase by said adjustable phase shifter to obtain signals having frequencies equal to the sum and difference of the frequencies of said fixed and variable frequency oscillators, first and second filtering means connected to said first and second combining means, respectively, for passing one of the signals derived from said combining means, both of said filtering means being arranged to pass signals in the same frequency band, a phase detector, means for applying the signals from said first and second filtering means to said phase detector whereby an initial indication of the difference in phase of said signals may be obtained, and means for disconnecting said second filtering means from said phase detector and connecting said circuit under test between said second filtering means and said phase detector, whereby the adjustment of said phase shifter to obtain an indication corresponding to said initial indication is a measure of the phase shift introduced by said circuit.

CLYDE E. INGALLS.

REFERENCES CITED

The following references are of record in the file of this patent:

UNITED STATES PATENTS

| Number | Name | Date |
|---|---|---|
| 2,047,782 | Jensen | July 14, 1936 |
| 2,077,172 | Hearn | Apr. 13, 1937 |
| 2,183,260 | Hofer | Dec. 12, 1939 |
| 2,285,038 | Loughlin | June 2, 1942 |
| 2,305,614 | Goldstein | Dec. 22, 1942 |
| 2,313,699 | Roberts | Mar. 9, 1945 |
| 2,416,310 | Hansen et al. | Feb. 25, 1947 |
| 2,416,517 | Farrow | Feb. 25, 1947 |
| 2,432,214 | Sontheimer | Dec. 9, 1947 |